Figure 2:
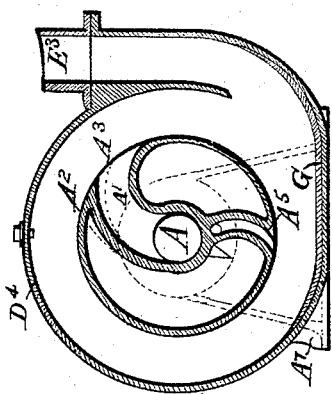

(No Model.) 2 Sheets—Sheet 1.

E. SEITZ.
CENTRIFUGAL PUMP.

No. 495,760. Patented Apr. 18, 1893.

Witnesses.
A. O. Sachse
Rich'd Sparrow

Inventor
Edward Seitz (No Model.) 2 Sheets—Sheet 2.

E. SEITZ.
CENTRIFUGAL PUMP.

No. 495,760. Patented Apr. 18, 1893.

Witnesses
A. O. Sachse
Rich'd Sparrow

Inventor
Edward Seitz

UNITED STATES PATENT OFFICE.

EDWARD SEITZ, OF MELBOURNE, VICTORIA.

CENTRIFUGAL PUMP.

SPECIFICATION forming part of Letters Patent No. 495,760, dated April 18, 1893.

Application filed May 22, 1891. Serial No. 393,792. (No model.) Patented in England May 9, 1891, No. 8,026, and in Switzerland July 9, 1891, No. 4,044.

*To all whom it may concern:*

Be it known that I, EDWARD SEITZ, consulting engineer, a British subject, residing at Market Buildings, in the city of Melbourne, Colony of Victoria, have invented an Improved Centrifugal Pump, of which the following is a specification.

The invention has been patented in England, No. 8,026, May 9, 1891, and in Switzerland, No. 4,044, July 9, 1891.

This invention relates to that class of pumps known as centrifugal pumps and has been devised for the purpose of obtaining a greater economy in the pumping of water, sludge, air, gases and other liquids and fluids than that now resulting from existing apparatus. In existing pumps a number of webs or blades attached to disks are rotated to produce a centrifugal action and the water or other liquid or fluid from the main supply has of necessity to be subdivided in an equal ratio to the number of such blades thus causing a considerable amount of friction to result from the water having to be drawn through small orifices.

The invention consists of a single web (or "blade") of a gracefully curved pipe formation which is practically a continuation of the main feed pipe and the shaft which rotates what I term the "single curved pipe web" is also of a pipe or hollow form and on this latter is mounted a pulley receiving rotatory power from a belt or other source. To overcome the thrust caused by the centrifugal action and water pressure I key into the center of the front of the disk a small solid shaft and allow it to proceed through the outer casing (in which it is journaled) and at its outer termination I place thereon a collar washer and two lock nuts the whole of which rotate with the disk.

Referring to the pipe shaft before-mentioned at convenient intervals I place around same liners of any approved metal which run in bearings suitably supplied with pressure lubricators and glands the said liners being grooved for the purpose of retaining the lubricant. Any distance between the liner and outer casing of bearing can be cast up with any suitable metal. In the pump (and before the first gland bearing) I place around the pipe shaft a metal spring ring which fits closely between the said shaft and the outer casing (faces having been previously turned up for its reception). For the purpose of retaining the said spring ring in its proper position on the said pipe shaft and to make it revolve therewith I employ a counter sunk screw which proceeds through the ring for some distance into a tapped hole in the metal of the said hollow-pipe shaft. At the back of this said spring ring I leave a small space to allow of an accumulation of lubricant to collect. At the end of the said pipe shaft I place a ring of lignum-vitæ (or analogous material) for the purpose of receiving any thrust which the adjustment of the before-mentioned solid shaft and set screws permits and also at the same time for the purpose of preventing any fluid from finding its way around to the outer surface of the rotating pipe or to or from the bearings and immediately on the other side of this ring I place the inlet water supply pipe. In the single curved pipe aforesaid the debouching end is either increased in diameter parallel or decreased to suit the different liquids or special heights of delivery or when pumping obstructive fluids and this increase or decrease may commence at any point along the said pipe shaft. The casing surrounding my hereinbefore described pump is as nearly as possible circular in form and on the bottom and immediately under the rotating curved pipe and disk is arranged a false bottom which is movable as circumstances require, and can be made in the form of a trap door, so that stones or other obstructions can be removed and wear and tear of the bottom renovated as desired. The whole is mounted on a suitable frame.

In the drawings herewith I show an alternate method of driving my said pumps which consists in placing the pulley on the small solid shaft the framing being altered to suit and an extra gland provided on the exterior of the casing at the position previously allotted to the collar and lock nuts. I also show an alternate method of arranging the casing and the lead-away duct for the fluid from the pipe web and as will be seen in this arrangement the driving may be performed by either of the two schemes hereinbefore described.

Reference may now be had to the accompanying drawings in which:—

Figure 4:
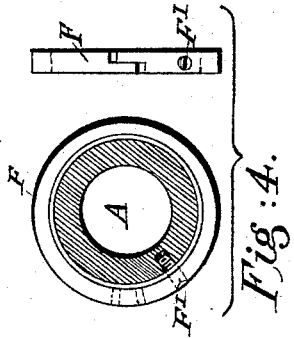
Figure 1:
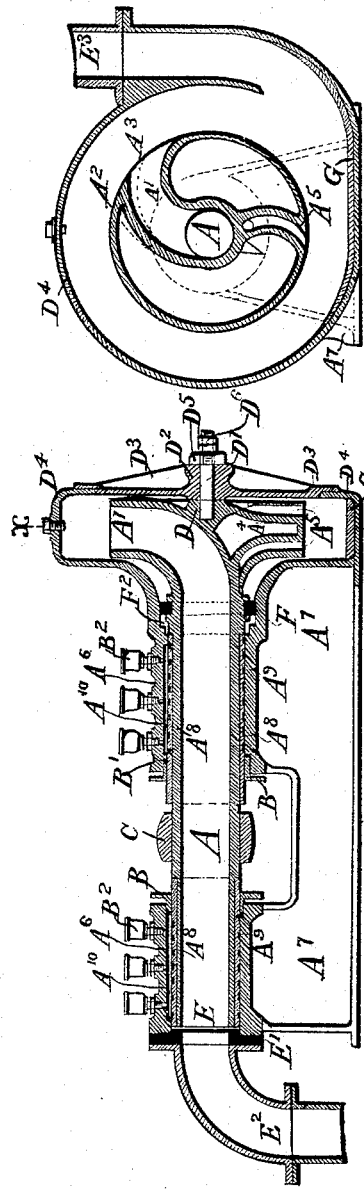
Figure 3:
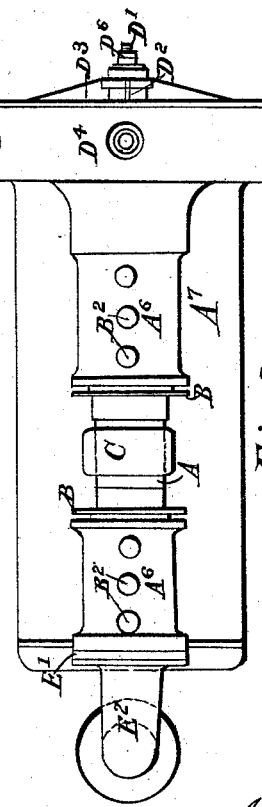
Figure 6:
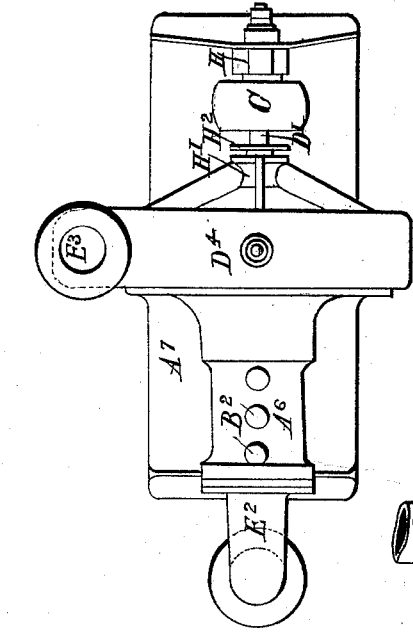
Figure 5:
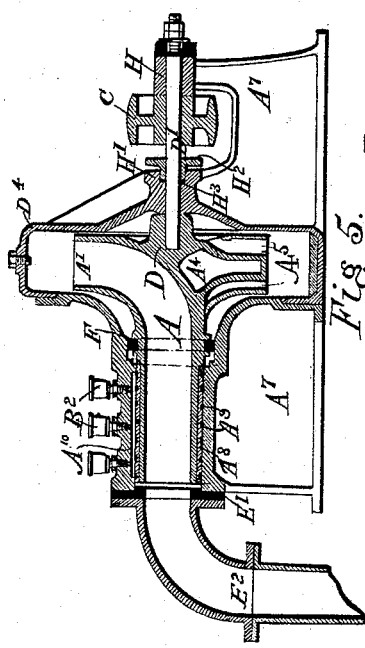
Figure 7:
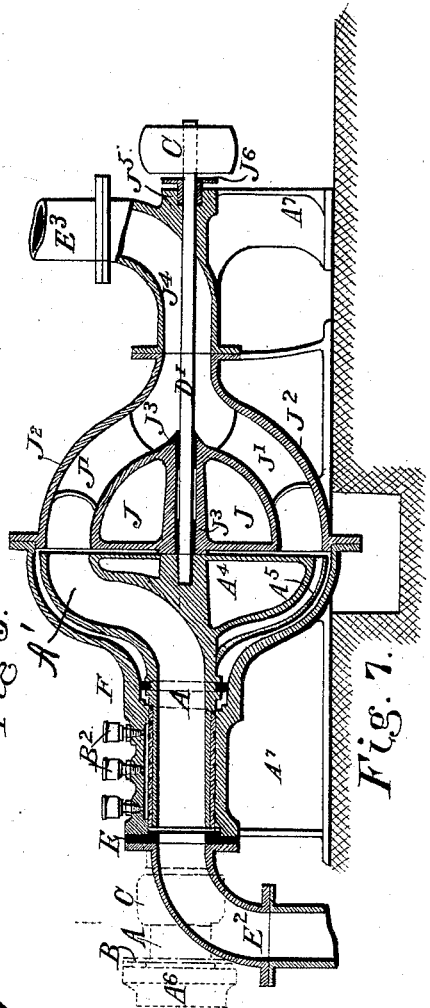

Figure 1 is a longitudinal section of my improved pump. Fig. 2 is a section on line $x$—$x$ of Fig. 1. Fig. 3 is a plan while Fig. 4 shows a plan and an elevation of the spring ring. Figs. 5 and 6 being a longitudinal section and plan respectively of an alternate form of construction of the pump. Fig. 7 is a longitudinal section of an alternate form of casing.

In the figures A is the revolving hollow pipe shaft terminating in the curved web discharge end A' which can be either expanded or contracted as at $A^2$ and $A^3$ (shown in Fig. 2) such expansion or contraction may commence at any point in the pipe A the purpose of same is herein explained.

The pipe shaft A works in bearings $A^6$ formed on the frame $A^7$ and fitted at its bearing points with liners $A^8$, having recesses $A^9$ formed therein for receiving and holding oil or other lubricant, also for same purpose recesses $A^{10}$ are formed in the bearings. These bearings $A^6$ are provided with glands B and packing B' (for preventing escape of fluid or lubricant) and with pressure lubricant cups $B^2$. At a central point between the bearings $A^6$ a pulley C is keyed on shaft A and to said pulley motion is imparted for driving the pump in the usual manner. At the operative end of shaft A a boss D is formed in which is keyed a trunnion spindle D' this spindle D' works in a bearing $D^2$ formed on the cover $D^3$ of the pump casing $D^4$. The spindle being provided with washer $D^5$ and jam nuts $D^6$ for adjusting the wear or thrust of the pipe A. At the other, or suction, end E a lignum-vitæ ring E' is fitted for receiving the thrust caused by the working of the pump.

$E^2$ is the suction pipe leading from well or other source of the liquid or fluid required to be pumped $E^3$ being the delivery or discharge pipe.

At the aforesaid operative end of pipe A is placed a spring ring F for the purpose of preventing leakage from the casing $D^4$ into the recess $A^{10}$. This ring F is placed in a recess suitably formed in pipe A and held therein by a counter-sunk set screw F'. The construction of this ring is clearly shown in Fig. 4. At the back of this ring F a space $F^2$ is formed to allow of an accumulation of lubricant for the ring. A false bottom G is provided at the lowest part of the casing $D^4$ or in latter a trap door can be placed so that sludge, stones, &c., can be easily removed. This false bottom when worn can be replaced by a new one, thus preventing injury to the bottom of said casing by foreign deposits.

The whole pump is mounted on the frame $A^7$ which can be bolted to wood work or other suitable foundation.

In Figs. 5 and 6, where an alternate construction is shown, the spindle D' is elongated and on same is placed the driving pulley C, the spindle working in bearings H and H' formed on the frame $A^7$, the latter bearing is provided with gland $H^2$ and packing $H^3$.

In Fig. 7 is shown an alternate construction of the outer casing for leading away the discharge water from the rotating curved pipe A. In this view J is a partly conical water guide box for leading the liquid or fluid to a point of union in the forward delivery pipe. This guide box J is held in central position by stay plates J' attached to the outer shell $J^2$ of the discharge casing. In this box J bearings $J^3$ are fitted for the spindle D', the latter passes through the discharge pipe $J^4$ on which is formed a bearing $J^5$ fitted with a gland $J^6$, the spindle extending sufficiently to receive the pulley C. The dotted lines represent the application of the driving system as shown in Fig. 1.

The mode of operation of my pump is as follows:—Motion being imparted to pulley C the pipe shaft A rotates causing centrifugal action to be generated at A' and the fluid or liquid to be drawn up through the pipe $E^2$ into pipe shaft A, through the mouth A', casing $D^4$ and thence into the delivery pipe $E^3$. The adjustable trunnion D' regulating the thrust which is received by the lignum-vitæ ring E'. During the rotation of the shaft A a tendency to expand is maintained by ring F thus keeping a tight joint so that no liquid can escape from casing $D^4$ toward the bearing $A^6$. Lubrication is performed through the cups $B^2$ from which the lubricant proceeds by space $A^{10}$ to grooves $A^9$, glands B and spring ring F at the back $F^2$ of which a supply can accumulate, also the lignum-vitæ bearing E' is in like-manner lubricated from cups $B^2$. It will thus be seen that I overcome a very objectionable feature in existing pumps inasmuch as the water in my pump flows right through it in an even and graceful manner thus minimizing friction to the lowest degree but in the said existing pumps the supply fluid when it arrives into the pump has to be suddenly branched or drawn into small streams (in accordance with the number of "blades" or "webs") and by being thus "wire-drawn" and churned an obstruction or friction is necessarily caused with consequent loss of power and inefficiency in pumping.

From the drawings it will be seen that the debouching end of my rotating curved pipe is alternately shown expanded or contracted as before mentioned by dotted lines and it will be seen also that I especially endeavor to cause the water or other fluids to flow or pass through the pumps in an unobstructed manner and to this end I make any increase or decrease in diameter as gradual as possible in accordance with the elevations to be pumped to or to suit the consistency of the fluids to be operated upon.

I would have it understood that I do not confine myself to any particular sizes or materials of construction nor to the number of any of the parts herein described and specified neither do I confine myself to a rigid adherence to the placing of any of the specified parts of my invention in regard to one another as such arrangement must to a great extent depend on local requirements and peculiarities.

Having now particularly described and ascertained the nature of my said invention and the manner in which the same is to be performed, I declare that what I claim is—

1. In a centrifugal pump, the combination of the bearing frame, the rotary pipe A journaled therein and having a lateral bent end, forming a single discharge continuation of the pipe the casing about the said bent end, the inlet pipe leading to the rotary pipe and the means for driving the rotary pipe, substantially as described.

2. In combination in a centrifugal pump of the frame having the journals, the inlet pipe extending to said journals, a single curved discharge pipe journaled to rotate in the frame, and extending laterally of the inlet pipe, to form a single curved continuation thereof and means for rotating the discharge pipe, substantially as described.

3. In combination in a centrifugal pump, the bearing frame having journals, the pipe A extending through the same and having a curved lateral bent end, forming a single discharge continuation of the pipe the inlet pipe leading to the pipe A, the means for rotating the said pipe, the casing surrounding the laterally bent end of the pipe, and the journal extending from the casing for the bent end of the pipe, the said bent end having a bearing to receive the said journal, substantially as described.

4. In combination the frame, the pipe A, the journals therefor in the frame, said pipe having a lateral bent end, the casing for the said end, the spring ring dividing the casing from the journal and the means for driving the pipe, substantially as described.

5. In combination the rotary shaft A having a laterally bent end, the means for driving the shaft, the frame having the journal with a space $F^2$ and a spring ring F, and the casing surrounding the laterally bent end of the pipe, substantially as described.

6. In combination in a centrifugal pump, a pipe A having a laterally bent end, journals for the said pipe, driving means for rotating it, a discharge casing, comprising an annular discharge space arranged adjacent to the mouth of the laterally bent end of the pipe A, and the discharge pipe leading from said discharge space, concentrically and in line with the pipe A, substantially as described.

7. In combination the frame, the pipe A journaled to rotate therein and having the laterally bent end, the casing for the said end having the annular discharge space, the discharge pipe arranged concentric to the said space and in line with the pipe A, and the driving shaft extending through the said casing and connected with the bent end of the pipe, substantially as described.

In witness whereof I have hereunto set my hand in presence of two witnesses.

EDWARD SEITZ.

Witnesses:
   JAS. HINGSTON,
      *Notary Public, Melbourne.*
   A. O. SACHSE.
      *C. E. Collins St., Melbourne.*